(12) United States Patent
Hayashi et al.

(10) Patent No.: US 6,503,588 B1
(45) Date of Patent: Jan. 7, 2003

(54) MULTILAYERED STRUCTURE

(75) Inventors: Nahoto Hayashi, Kurashiki (JP);
Hiroyuki Shimo, Kurashiki (JP);
Kaoru Nemoto, Sowa-Town (JP);
Kazuhiko Negishi, Sowa-Town (JP)

(73) Assignee: Kuraray Co., Ltd., Kurashiki (JP)

( * ) Notice: Subject to any disclaimer, the term of this patent is extended or adjusted under 35 U.S.C. 154(b) by 143 days.

(21) Appl. No.: 09/589,805

(22) Filed: Jun. 9, 2000

(30) Foreign Application Priority Data

Jun. 11, 1999 (JP) .......................................... 11-164956
Aug. 24, 1999 (JP) .......................................... 11-236424

(51) Int. Cl.$^7$ ........................... B32B 1/02; B32B 27/30; B65D 1/28
(52) U.S. Cl. ..................... 428/36.7; 428/36.6; 428/215; 428/216; 428/516; 428/520; 428/910
(58) Field of Search .............................. 428/35.4, 36.6, 428/36.7, 515, 520, 522, 516, 215, 216, 910

(56) References Cited

U.S. PATENT DOCUMENTS

| | | | |
|---|---|---|---|
| 4,079,850 A | 3/1978 | Suzuki et al. ................ | 215/1 C |
| 4,561,920 A | 12/1985 | Foster .................... | 156/244.11 |
| 4,590,131 A | 5/1986 | Yazaki et al. ................ | 428/516 |
| 4,855,181 A | 8/1989 | Shimo et al. ................ | 428/336 |
| 4,880,706 A | 11/1989 | Mazuera et al. ............. | 428/516 |
| 4,898,784 A | 2/1990 | Sanders et al. ............. | 428/412 |
| 5,972,447 A | 10/1999 | Hata et al. .................. | 428/35.7 |
| 6,033,749 A | 3/2000 | Hata et al. .................. | 428/36.7 |
| 6,203,893 B1 * | 3/2001 | Nohara et al. ............... | 428/213 |
| 6,294,602 B1 | 9/2001 | Shimo et al. ................ | 524/394 |

FOREIGN PATENT DOCUMENTS

| | | |
|---|---|---|
| EP | 0 832 928 | 4/1998 |
| EP | 0 990 513 | 4/2000 |
| JP | 52-103481 | 8/1977 |
| WO | WO 89/11392 | 11/1989 |

OTHER PUBLICATIONS

U.S. patent application Ser. No. 09/909,832, filed Jul. 23, 2001, pending.

U.S. patent application Ser. No. 09/909,831, filed Jul. 23, 2001, pending.

U.S. patent application Ser. No. 09/680,966, filed Oct. 6, 2000, pending.

U.S. patent application Ser. No. 09/856,478, filed Jun. 8, 2001, pending.

U.S. patent application Ser. No. 09/942,665, filed Aug. 31, 2001, pending.

U.S. patent application Ser. No. 09/612,259, filed Jul. 7, 2000, pending.

U.S. patent application Ser. No. 09/828,152, filed Apr. 9, 2001, pending.

* cited by examiner

Primary Examiner—D. S. Nakarani
(74) Attorney, Agent, or Firm—Oblon, Spivak, McClelland, Maier & Neustadt, P.C.

(57) ABSTRACT

The present invention provides a multilayered structure where an A layer made of an ethylene-vinyl alcohol copolymer resin (A) and a C layer made of a polypropylene resin (C) are laminated via a B layer made of an adhesive resin (B). The ethylene content of the ethylene-vinyl alcohol copolymer resin (A) is 20 to 60 mol %, and the saponification degree of the resin (A) is at least 90%. The melt flow rate (MFR) of the polypropylene resin (C) at 230° C. under a load of 2160 g is in the range from 0.1 to 100 g/10 min, and the stereoregularity index [M5] of the polypropylene resin (C) is at least 0.950. Such a multilayered structure has excellent gas barrier properties and moldability.

19 Claims, No Drawings

MULTILAYERED STRUCTURE

BACKGROUND OF THE INVENTION

1. Field of the Invention

The present invention relates to a multilayered structure where a resin layer made of an ethylene-vinyl alcohol copolymer and a polypropylene resin layer are laminated via an adhesive resin layer. In particular, the present invention relates to a multilayered structure that has excellent gas barrier properties, thermoformability and mechanical properties and is useful in a variety of fields, for example as a gas barrier film and a food container.

2. Description of the Related Art

In general, a polypropylene resin (hereinafter, referred to also as PP) can be easily processed, for example easily stretched, and a molded product thereof has excellent mechanical properties and a good appearance. Therefore, polypropylene resins are used in a wide range of fields including food packaging. However, one drawback of PP is its poor gas barrier properties.

On the other hand, ethylene-vinyl alcohol copolymer (hereinafter, referred to also as EVOH) is characterized by its excellent gas barrier properties to oxygen, carbon dioxide and nitrogen, transparency and oil resistance. Therefore, for example, a film made of EVOH is used as a material for packaging a product whose quality should be preserved, such as food and medicine. However, EVOH is disadvantageous in that the gas barrier properties are influenced significantly by humidity and become low under high humidity, and its impact strength is poor.

In this context, in order to compensate for the drawback of the low gas barrier properties of the PP and the drawbacks of the poor humidity resistance and the poor impact resistance of the EVOH, a multilayered film is produced where a polyolefin that has excellent humidity resistance and impact resistance, for example a PP, and an EVOH that has excellent gas barrier properties are laminated. Furthermore, a container obtained by thermoforming a multilayered structure where polypropylene and EVOH are laminated is used as a food container or the like.

However, the thermal processability of the EVOH generally is significantly low, compared with that of a polypropylene resin. For example, in the production of an oriented multilayered film by stretching a multilayered structure comprising an EVOH and a PP, the stretchability of the EVOH is significantly poor, compared with that of the PP. In the production of a container with a multilayered film by thermoforming, cracks, pinholes or local thickness deviations are generated in the EVOH layer, so that the gas barrier properties of the obtained container may be poor. Furthermore, cracks or wave patterns may be generated on the side face of the container, and this may prevent a thermoformed container from having a good appearance.

In the production of the oriented multilayered film, various methods are under development to provide the EVOH with sufficient stretchability.

For example, Japanese Patent No. 2679823 U.S. Pat. No. 4,880,706) discloses a biaxially oriented film formed of a multilayered structure of PP layer/adhesive layer/EVOH layer/adhesive layer/PP layer as a multilayered barrier film employing EVOH and polyolefin. This film is characterized by its composition and its production method. As the EVOH used for this film, an EVOH having an ethylene content of at least 45mol %, a hydrolysis degree of at least 99%, and an melt flow rate (hereinafter, may be referred to as MFR) of 14 to 18 g/10 min at 190° C. under a load of 2,160 g is preferable. In addition, as the polyolefin used for this film, a PP having an MFR of 2 to 6 g/10 min is disclosed in this patent. This film is obtained by producing a multilayered structure (multilayered coextruded film) of EVOH and polyolefin, immediately cooling the multilayered structure rapidly to around 50° C., preheating it in the range from 135 to 150° C., stretching it to 4 to 7 times larger in the longitudinal direction, preheating it in the range from 170 to 180° C., and stretching it to 7 to 10 times larger in the transverse direction in the range from 155 to 165° C.

Furthermore, for example, Japanese Laid-Open Patent Publication No. 60-187538 (U.S. Pat. No. 4,561,920) describes that it is preferable to use an EVOH having a MFR of at least about 8 g/10 min for a laminated film of EVOH and polyolefin. In this publication, the multilayered structure comprising the EVOH is cooled rapidly to prevent the crystallinity of the EVOH from exceeding about 25%.

All of the above publications use an EVOH having a MFR in a specific range or an EVOH having a high ethylene content in order to provide the EVOH with sufficient stretchability. These laminated films using such an EVOH do not necessarily have high gas barrier properties.

In the case of the production of a container with a multilayered film by thermoforming, various methods have been proposed to improve the thermoformability or the impact resistance, including incorporation of nylon into EVOH (U.S. Pat. No. 4,079,850). However, there are still problems to be solved, such as unsatisfactory thermoformability, reduced gas barrier properties, unsatisfactory thermal stability during film production, and possibly, low transparency, depending on the type of resin or the state of dispersion of the nylon in EVOH. Thus, sufficient improvements have not been fulfilled yet.

A recent tendency for a wider range of applications of a thermoformed container requires the formation of a complex shape having a deep drawing depth. In the production of a container with a multilayered film of the EVOH and PP by thermoforming, it is necessary for the EVOH to have sufficient moldability, especially in the thermoforming of a complex shaped container having a deep drawing depth. In this case, in order to provide the EVOH with sufficient moldability, an EVOH having a high ethylene content or a low saponification degree has to be used.

However, the gas barrier properties of the EVOH are such that the higher ethylene content or the lower saponification degree results in the poorer gas barrier properties. Thus, a multilayered structure for producing a container having a deep drawing depth, a complex shape and sufficient gas barrier properties has not been obtained yet.

As described above, the EVOH has poor moldability, and therefore providing the EVOH with sufficient moldability, namely, increasing the ethylene content in the EVOH, is under examination. However, it is well-known that the smaller the ethylene content is, the better the gas barrier properties of the EVOH are, except for under extremely high humidity conditions such as 100%RH. Thus, at present, an EVOH-PP multilayered structure that has sufficient moldability and that can provide a molded product such as a film or a container with sufficient gas barrier properties even under high humidity has not been obtained yet. Investigation regarding the PP to be laminated with the EVOH is also insufficient.

SUMMARY OF THE INVENTION

The present invention includes a multilayered structure where an A layer made of an ethylene-vinyl alcohol copolymer resin (A) and a C layer made of a polypropylene resin (C) are laminated via a B layer made of an adhesive resin (B); wherein the ethylene content of the ethylene-vinyl alcohol copolymer resin (A) is 20 to 60 mol %, and the saponification degree of the resin (A) is at least 90%; the melt flow rate (MFR) of the polypropylene resin (C) at 230° C. under a load of 2160 g is in a range from 0.1 to 100 g/10 min; and the stereoregularity index [M5] of the polypropylene resin (C) defined by Equation 1, with absorption intensities of Pmmmm and Pw in the $^{13}$C-NMR spectrum of a boiling heptane insoluble component of the polypropylene resin (C), is at least 0.950, $$[M5]=[Pmmmm]/[Pw] \quad (1)$$

wherein [Pmmmm] is the absorption intensity derived from methyl groups of third propylene units in the polypropylene resin (C), each of the third propylene units being the third unit of five consecutive propylene units that are isotactically bonded, and [Pw] is the absorption intensity derived from all methyl groups of the propylene units.

In a preferred embodiment, the ethylene-vinyl alcohol copolymer resin (A) comprises at least two ethylene-vinyl alcohol copolymer resins having different melting points.

In a preferred embodiment, the ethylene content of the ethylene-vinyl alcohol copolymer resin (A) is 30 to 50 mol %.

In a preferred embodiment, the adhesive resin (B) is a polyolefin modified with carboxylic acid.

In a preferred embodiment, the multilayered structure is a film stretched to 3 to 12 times larger in at least one direction.

In a preferred embodiment, the multilayered structure is a laminated film obtained by forming a laminate comprising the A layer, the B layer and the C layer by simultaneous co-extrusion molding and biaxially stretching this laminate, in which the laminate is stretched to 4 to 10 times larger in the longitudinal direction and 5 to 12 times larger in the transverse direction.

In a preferred embodiment, the multilayered structure is a laminated film obtained by stretching a film made of a polypropylene resin (C) to 4 to 10 times larger in the longitudinal direction, laminating the B layer and A layer in this order on the surface of the film made of the polypropylene resin (C) by extrusion-coating to form a laminate, and stretching the laminate to 5 to 12 times larger in the transverse direction.

In a preferred embodiment, the multilayered structure is a laminated film obtained by stretching a film made of a polypropylene resin (C) having the B layer on a surface thereof to 4 to 10 times larger in the longitudinal direction, laminating the A layer made of ethylene-vinyl alcohol copolymer resin (A) or a laminate comprising the A layer on the B layer of the obtained stretched film by extrusion-coating to form a laminate, and stretching the laminate to 5 to 12 times larger in the transverse direction.

The present invention further includes a thermoformed container obtained by thermoforming the multilayered structure mentioned above.

In a preferred embodiment, the thermoformed container satisfies Equations (2.1) to (2.3):

$$S \leq T/t \leq 20S \quad (2.1)$$

$$300 \leq T \leq 3000 \quad (2.2)$$

$$t \geq 100 \quad (2.3)$$

where T is the total thickness ($\mu$m) of all layers in the thickest portion of the container, t is the total thickness ($\mu$m) of all layers in the thinnest portion of the container, and S is the draw ratio of the container, and S is expressed by Equation (2.4):

$$S=(\text{depth of the container})/(\text{diameter of a circle having the largest diameter that can be inscribed in an opening of the container}) \quad (2.4).$$

Therefore, the present invention described herein makes possible the objectives of: providing a multilayered structure where a resin layer made of an ethylene-vinyl alcohol copolymer and a PP layer are laminated via an adhesive layer and that can be formed into an oriented multilayered film having excellent gas barrier properties, especially under high humidity, flavor retaining properties, and transparency; and providing a multilayered structure having the above features and excellent moldability in thermoforming, so that the ethylene-vinyl alcohol copolymer resin layer of the molded product is free from cracks, pinholes, and local thickness deviations, and the molded product has excellent gas barrier properties and a good appearance.

These and other advantages of the present invention will become apparent to those skilled in the art upon reading and understanding the following detailed description.

DESCRIPTION OF THE PREFERRED EMBODIMENT

The inventors of the present invention examined polypropylene resins used for the PP layer, which have hardly been studied, of the EVOH-PP multilayered structure. As a result, the inventors succeeded in developing a multilayered structure having excellent gas barrier properties even under high humidity and moldability, such as stretchability and thermoformability by combining an EVOH having high gas barrier properties and a specific PP resin, and thus achieved the present invention.

The multilayered structure of the present invention is directed to a multilayered structure where an A layer made of an ethylene-vinyl alcohol copolymer resin (A) and a C layer made of a polypropylene resin (C) are laminated via a B layer made of an adhesive resin (B). Herein, for example, "an A layer made of an ethylene-vinyl alcohol copolymer resin (A)" includes both the cases where the A layer is made only of an ethylene-vinyl alcohol copolymer resin and where the A layer is made of a mixture comprising an ethylene-vinyl alcohol copolymer resin and other resins and/or various additives, as described later. The same applies to the expressions, "a B layer made of an adhesive resin (B)" and "a C layer made of a polypropylene resin (C)". The ethylene content of the ethylene-vinyl alcohol copolymer resin (A) is 20 to 60 mol %, and the saponification degree of the resin (A) is at least 90%.

The melt flow rate (MFR) of the polypropylene resin (C) at 230° C. under a load of 2160 g is in the range from 0.1 to 100 g/10 min. Furthermore, the stereoregularity index [M5] of this polypropylene resin (C) defined by Equation 1, with absorption intensites of Pmmmm and Pw in the $^{13}$C-NMR spectrum of a boiling heptane insoluble component of the polypropylene resin (C), is at least 0.950.

$$[M5]=[Pmmmm]/[Pw] \quad (1)$$

wherein [Pmmmm] is the absorption intensity derived from methyl groups of third propylene units in the polypropylene resin (C), each of the third propylene units being the third unit of five consecutive propylene units that are isotactically bonded, and [Pw] is the absorption intensity derived from all methyl groups of the propylene units.

One feature of the present invention lies in using a polypropylene resin having a specific stereoregularity index [M5]. The stereoregularity index [M5] will be described more specifically below.

An example of a polypropylene homopolymer can be shown, for example by the following simplified formula (c) (showing a part of the polymer structure). In this formula, $Me^1$ to $Me^7$ are methyl groups, and hydrogen atoms bonded to carbon atoms are omitted. The methyl groups facing upward and the methyl group facing downward indicate that they are bonded to carbons in opposite directions in the propylene unit.

(c)

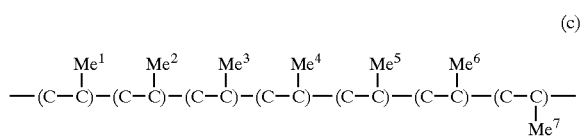

Herein, the propylene unit where the methyl group faces upward,

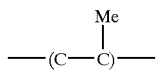

is represented by ⌐ and the propylene unit where it faces downward is represented by ¬. The state where ⌐ and ⌐ are bonded or where ¬ and ¬ are bonded is represented by m, and the state where ⌐ and ¬ are bonded or where ¬ and ⌐ are bonded is represented by r. In this case, ⌐⌐⌐⌐ is represented by mmmm, and ⌐⌐⌐⌐⌐ ¬ that is the structure shown by formula (c), is represented by mmmmr. m represents meso, and r represents racemi.

A large number of propylene units are present in the polymer chain structure of polypropylene. Among these, Pmmmm is the absorption intensity in the $^{13}$C-NMR spectrum derived from the methyl group (e.g., corresponding to $Me^3$ and $Me^4$ in the above formula (c)) of the third unit of any five consecutive propylene unit portions whose methyl groups are in the same directions (represented by mmmm, corresponding to ⌐⌐⌐⌐⌐ in the above polymer chain). When Pw is the absorption intensity derived from all the methyl groups in the propylene units (all the methyl groups in the polypropylene homopolymer comprising $Me^1$, $Me^2$, $Me^3$, . . . ), the stereoregularity of the polymer shown by formula (c) can be expressed by the stereoregularity index [M5] (which can be obtained with the above-described equation (1)), which is the ratio of Pmmmm to Pw.

To obtain the stereoregularity index [M5] of the polypropylene resin (C), the polypropylene resin (C) is analyzed for $^{13}$C-NMR. In the analysis, trace amounts of low molecular weight components such as polyethylene or polypropylene oligomer contained in the polypropylene resin (C) are removed beforehand, and the resultant material (i.e., a boiling heptane insoluble component of the polypropylene resin (C)) is analyzed. The boiling heptane insoluble component can be obtained by the following method (which will be described more specifically in the examples below). A polypropylene resin and 2,6-di-tert-butyl-4-methylphenol are heated and dissolved in n-decane, and then the mixture is allowed to stand for cooling. Then, the mixture is held in a water bath at 20 to 23° C. for at least 8 hours (e.g., 8 to 10 hours) so that a polymer (n-decane insoluble component) is precipitated. The polymer is dried and then subjected to Soxhlet extraction with heptane for at least 6 hours (e.g., 6 to 8 hours). The residual resin is dried and is used as a boiling heptane insoluble component.

The stereoregularity index [M5] of the polypropylene resin (C) employed in the present invention is at least 0.950. It is generally 0.950 to 0.995, preferably 0.960 to 0.995, and more preferably 0.970 to 0.995. The polypropylene resin (C) having such a range of the stereoregularity index [M5] has a high stereoregularity and a high crystallinity. Such a polypropylene resin (C) has a high rigidity and high heat resistance because of its high thermal deformation temperature, melting point and crystallization temperature. Therefore, thermoformation of a multilayered structure comprising the PP and an EVOH can be performed at a high temperature. Thus, the multilayered structure can be provided with good moldability, even if the multilayered structure contains an EVIOH having a low ethylene content, which conventionally has been difficult to mold.

When the stereoregularity index [M5] is lower than 0.950, the moldability of the multilayered structure is not sufficient. For example, stretching of a film cannot be performed at high temperatures, so that an EVOH having a low ethylene content cannot be used as the EVOH for the multilayered structure.

The MFR of the polypropylene resin (C) at 230° C. under a load of 2160 g is 0.1 to 100 g/10 min, preferably 1 to 50 g/10 min, and more preferably 2 to 10 g/10 min. When the MFR of the polypropylene resin (C) is less than 0.1 g/10 min, the burden applied to an extruder becomes large. When it exceeds 100 g/10 min, unevenness in flow occurs between the layers during extrusion molding, which makes it difficult to form the multilayered structure.

The polypropylene resin (C) having the above-described nature has a high stereoregularity and a high crystallinity, and thus a high rigidity and excellent heat resistance because of its high thermal deformation temperature, melting point and crystallization temperature. Therefore, stretching of a multilayered structure comprising an EVOH and the polypropylene (C) can be performed at a high temperature. Thus, the multilayered structure can be stretched in a high stretch ratio, even if an EVOH having a low ethylene content, which conventionally has not been able to be stretched, is used.

The polypropylene resin (C) can contain a nucleating agent, an antioxidant, an antistatic agent, a lubricant, an anti-blocking agent, an ultraviolet absorber, a petroleum resin or the like, as long as it does not inhibit the fulfillment of the object of the present invention.

Examples of the nucleating agent include sorbitol derivatives such as dibenzylidene sorbitol and dimethylbenzylidene sorbitol; an alkali metal salt or an aluminum salt of aromatic carboxylic acid such as sodium p-tert-butyl benzoate and aluminum dibenzoate; an organic nucleating agent typified by a metal salt of an aromatic phosphate ester such as sodium 2,2-methylene bis(4,6-di-tert-butylphenyl) phosphate; an inorganic nucleating agent such as talc or mica; and a polymer nucleating agent such as a polymer having cyclic compounds at its side chain (e.g., polycyclohexene, polycyclopentene or polycyclobutene), a polymer of branched olefin having at least 3 carbon atoms (e.g., poly 3-methyl-1-butene, poly 3-methyl-1-pentene, poly 3-ethyl-1-pentene, and poly 4-methyl-1-pentene), and fluorine-containing polymers (e.g., polytetrafluoroethylene).

Examples of the antioxidant include phenol derivatives of BHT (BHT: 5,5'-bi-1H-tetrazole), 2,2'-methylene bis(4- methyl-6-t-butylphenol), 2-hydroxy-4-methoxybenzophenone, 2-hydroxy-4-octoxybenzophenone, 2,4-dihydroxybenzophenone, substituted benzotriazoles (e.g., 2-(2'-hydroxy-5'-methylphenyl)benzotriazole), 2-ethylhexyl-2-cyano-3,3-diphenyl acrylate, ethyl-2-cyano-3,3-diphenyl acrylate, phenyl salicylate and 4-t-butylphenyl salicylate.

Examples of the antistatic agent include alkylamines and derivatives thereof, higher alcohols, glycerin esters of higher fatty acids, pyridine derivatives, sulfated oil, soaps, salts of olefin sulfates, alkyl sulfates, fatty acid ethyl sulfonate, alkyl sulfonates, alkyl naphthalene sulfonates, alkylbenzene sulfonates, naphthalene sulfonate, succinic acid esters substituted with sulfonate, salts of phosphoric esters, partial fatty acid esters of polyhydric alcohol, ethylene oxide adducts of aliphatic alcohol, ethylene oxide adducts of fatty acid, ethylene oxide adducts of aliphatic amine or aliphatic amide, ethylene oxide adducts of alkylphenol, ethylene oxide adducts of alkylnaphtol, ethylene oxide adducts of partial fatty acid esters of polyhydric alcohol, and polyethylene glycol.

Examples of the lubricant include stearic acid, stearamide, oleamide, higher alcohols, and liquid paraffin.

Examples of the anti-blocking agent include synthetic silica, calcium carbide, amorphous aluminosilicate, zeolite, diatomaceous earth, talc, feldspar, and crosslinked polymethyl methacrylate.

Examples of the ultraviolet absorber include ethylene-2-cyano-3,3'-diphenyl acrylate, 2-(2'-hydroxy-5'-methylphenyl)benzotriazole, 2-(2'-hydroxy-3'-t-butyl-5'-methylphenyl) 5-chlorobenzotriazole, 2-hydroxy-4-methoxybenzophenone, 2,2'-dihydroxy-4-methoxybenzophenone, and 2-hydroxy-4-octoxybenzophenone.

Examples of the petroleum resin include hydrogenated petroleum resins such as polydicyclopentadiene having a Tg (glass transition temperature) of 70° C. or more and a hydrogenation degree of 99% or more, or terpene resins substantially free from polar groups (e.g., pinene, dipentene, carene, myrcene, ocimene, limonene, terpinene, sabinene, tricyclene, bisabolene, zingiberene, santalene, camphorene, mirene, totarene, etc.).

The polypropylene resin (C) can contain a polypropylene other than the specific polypropylene resin (C) or a polyolefin other than polypropylene, as long as it does not inhibit the fulfillment of the object of the present invention. Furthermore, the polypropylene resin (C) can be a mixture of two or more polypropylene resins.

The ethylene-vinyl alcohol copolymer resin (A) (hereinafter, referred to also as EVOH resin (A)) used in the present invention has an ethylene content of about 20 to 60 mol % and a saponification degree of about 90% or more.

The ethylene content of the EVOH resin (A) is about 20 to 60 mol %, as described above, and the content is preferably about 30 to 50 mol %. When the ethylene content is lower than about 20 mol %, it becomes difficult to form a laminate with the PP. For example, it becomes difficult to stretch a laminated film, and the moldability is poor in thermoforming the laminate to produce a container. On the other hand, when the ethylene content exceeds about 60 mol %, the gas barrier properties of the obtained multilayered structure are not sufficient.

In the case where the mlultilayered structure is used, for example, as an oriented film, the ethylene content is preferably about 35 to 50 mol %, more preferably about 37 to 48 mol %, and most preferably about 40 to 45 mol %.

In the case where the multilayered structure is used, for example, as a thermoformed container, the ethylene content is preferably about 30 to 45 mol %, more preferably about 30 to 40 mol %, and most preferably about 30 to 35 mol %.

The saponification degree of the EVOH resin (A) is required to be about 90 mol % or more, preferably about 95 mol % or more, and most preferably 99% or more. This range of the saponification degree is preferable to ensure the gas barrier properties of the obtained multilayered film. Also in the case where the EVOH resin is a mixture, as described later, it is preferable that the saponification degree of the mixture is in the above range.

The ethylene content and the saponification degree of the EVOH resin (A) are determined by $^1$H-NMR.

The EVOH resin (A) can be a blend of at least two EVOHs. Using such a blend further improves the stretchability of the multilayered structure of the present invention. The EVOH resin (A) is preferably a mixture of two ethylene-vinyl alcohol copolymers (a1, a2) having different melting points, and satisfies Equations (2.1) to (2.3).

$$150 \leq MP(a1) \leq 172 \tag{2.1}$$

$$162 \leq MP(a2) \leq 200 \tag{2.2}$$

$$4 \leq \{MP(a2) - MP(a1)\} \leq 30 \tag{2.3}$$

where MP(a1) represents the melting point (° C.) of the ethylene-vinyl alcohol copolymer (a1) measured by a differential scanning calorimeter (DSC), and MP(a2) represents the melting point (° C.) of the ethylene-vinyl alcohol copolymer (a2) measured by a differential scanning calorimeter (DSC).

When MP(a1) is less than 150° C., the gas barrier properties of the multilayered structure comprising such an EVOH resin mixture may not be sufficient to satisfy the requirement. On the other hand, when it exceeds 172° C., the stretchability and/or the thermoformability of the EVOH resin mixture may be insufficient. It is more preferable that the temperature range of MP(a1) satisfies Equation (2.1.1).

$$155 \leq MP(a1) \leq 170 \tag{2.1.1}$$

Furthermore, when MP(a2) is less than 162° C., the gas barrier properties of the multilayered structure comprising such an EVOH resin mixture may not be sufficient to satisfy the requirement. On the other hand, when it exceeds 200° C., the stretchability and/or the thermoformability of the EVOH resin mixture may be insufficient.

It is more preferable that the temperature range of MP(a2) satisfies Equation (2.2.1).

$$165 \leq MP(a2) \leq 200 \tag{2.2.1}$$

Furthermore, when the difference in the melting point between the two EVOHs {MP(a2)−MP(a1)} is less than 4° C., sufficient stretchability and/or thermoformability and sufficient barrier properties may not be obtained at the same time. On the other hand, when it exceeds 30° C., the transparency of the obtained oriented film or thermoformed container may be poor.

It is more preferable that the difference in melting point between the two EVOHs {MP(a2)−MP(a1)} satisfies Equation (2.3.1).

$$7 \leq \{MP(a2) - MP(a1)\} \leq 30 \tag{2.3.1}$$

The melting point of EVOH can be adjusted, for example by changing the ethylene content. When the ethylene content is unchanged, the melting point can be adjusted by changing the saponification degree.

The contents of the two ethylene-vinyl alcohol copolymers (a1, a2) in the EVOH resin mixture are not particularly limited, but preferably about 10 to 90 wt % each, more preferably about 20 to 80 wt %, and most preferably about 30 to 70 wt %.

In the case where the EVOH resin (A) is a mixture of EVOHs (a1) and (a2), the total content of ethylene in the mixed EVOH resin is about 20 to 60 mol %, as described above. In the case where the multilayered structure is used, for example, as an oriented film, the total content of ethylene in the mixed EVOH is preferably about 35 to 50 mol %, more preferably about 37 to 48 mol %, and most preferably about 40 to 45 mol %. On the other hand, in the case where the multilayered structure is used, for example, as a thermoformed container, the content of the entire ethylene in the mixed EVOH is preferably about 30 to 45 mol %, more preferably about 30 to 40 mol %, and most preferably about 30 to 35 mol %.

In the case where the EVOH resin (A) is a mixture of EVOHs (a1) and (a2), the ethylene content of the EVOH (a1) resin is preferably about 20 to 55 mol %, more preferably about 25 to 50 mol %. The ethylene content of the EVOH (a2) resin is preferably about 33 to 55 mol %, more preferably about 35 to 50 mol %. The difference in the ethylene content between the EVOHs (a1) and (a2) is preferably 3 to 30 mol %, and more preferably 3 to 20 mol %, and most preferably about 3 to 15 mol %.

The saponification degrees of the EVOHs (a1) and (a2) are not particularly limited, but for either of the EVOHs it is preferably at least 90%, more preferably at least 95 mol %, and most preferably at least 99%. The saponification degree of the entire EVOH resin also is preferably at least 90%, more preferably at least 95 mol %, and most preferably at least 99%.

The saponification degree in the above range is preferable to ensure the gas barrier properties of the obtained thermoformed container.

In the case where two EVOHs having different melting points are blended, it can be distinguished from a regular EVOH of a single component by thermal analysis, especially DSC analysis. In the case where the melting points are significantly different between two or more EVOHs that are blended, two or more peaks can be observed in the DSC analysis. In the case where EVOHs having similar melting points are blended, the peak may be apparently single. However, even in the case of the single peak, two or more peaks or peaks in the shoulder together with a primary peak may be observed by lowering the rate of raising the temperature in the DSC analysis.

An EVOH having a melting point outside of the specific range of melting points can be contained in addition to the two EVOH resins having melting points within the specific range, as long as it does not inhibit the fulfillment of the object of the present invention.

The EVOH resin may be a copolymer with a small amount of an other polyolefin, as long as it does not inhibit the performance of the EVOH resin (A). Examples of a monomer as a copolymer component include α-olefins such as propylene, 1-butene, isobutene, 4-methyl-1-pentene, 1-hexene, and 1-octene.

The melt flow rate (MFR) (at 210° C. under a load of 2160 g according to JIS K7210) of the EVOH resin (A) used in the present invention is preferably 0.1 to 10 g/10 min, and more preferably 0.5 to 50 g/10 min.

When the MFR of the EVOH resin (A) is less than 1 g/10 min, it becomes difficult to perform melt-formation. In this case, a film can be formed only by the casting method. In this case, a highly stretched film cannot be made with the obtained multilayered structure. On the other hand, when the MFR is more than 100 g/10 min, the difference between the flowability of the resins during formation becomes significant, so that a satisfactory laminate cannot be obtained. For this reason, for example, it becomes difficult to stretch the obtained multilayered structure in a high stretch ratio, and the obtained oriented multilayered film cannot have sufficient strength. Also, for example, when thermoforming the multilayered structure into a molded product, it becomes difficult to form the product by deep drawing, and the obtained product cannot have sufficient strength.

Furthermore, a thermal stabilizer, an ultraviolet absorber, an antioxidant, a colorant, a filler, other resins (e.g., polyamide or polyolefin), a plasticizer (e.g., glycerin or glycerin monostearate), and the like can be blended to the EVOH resin (A), as long as they do not inhibit the fulfillment of the object of the present invention.

Furthermore, as described later, the characteristics of the EVOH resin (A) can be improved by adding a boron compound, an alkali metal salt, a phosphorus compound or the like to the EVOH resin (A).

The boron compound can be added to improve the melt viscosity of the EVOH resin (A). When the EVOH resin (A) is a mixture of two or more EVOHs, each EVOH can be mixed more uniformly with the incorporation of the boron compound. Moreover, in the production of a multilayered film, a uniform multilayered film can be produced by co-extrusion. Examples of the boron compound include boric acids, boric esters, borates, boron hydrides, and the like. More specifically, examples of the boric acids include orthoboric acid, metaboric acid, and tetraboric acid. Examples of the boric esters include triethyl borate and trimethyl borate, and examples of the borates include alkali metal salts and alkaline earth metal salts of the boric acids as listed above, and borax. Among these compounds, orthoboric acid is preferable.

The content of the boron compound is preferably 20 to 2000 ppm on the basis of the boron element, and more preferably 50 to 1000 ppm. This range provides an EVOH with improved torque uniformity in a heating and melting process. A content of less than 20 ppm provides only a small effect, and a content of more than 2000 ppm may lead to gel formation, resulting in poor moldability in some cases.

Furthermore, the alkali metal salt can be added to improve interlayer adhesion and the compatibility of each of the layers in the multilayered structure. It is preferable to incorporate the alkali metal salt in an amount of 5 to 5000 ppm on the basis of the alkali metal element into the EVOH resin (A).

The content of the alkali metal salt is more preferably 20 to 1000 ppm on the basis of the alkali metal element, and even more preferably 30 to 500 ppm. Examples of the alkali in the alkali metal salt include lithium, sodium and potassium. Preferable examples of the metal salt include aliphatic carboxylates, aromatic carboxylates, phosphates, metal complexes and the like, each including monovalent metal(s). For example, sodium acetate, potassium acetate, sodium phosphate, lithium phosphate, sodium stearate, potassium stearate, and a sodium salt of ethylenediamine tetraacetic acid can be used. Among these, sodium acetate, potassium acetate and sodium phosphate are preferable.

The phosphorus compound mentioned above can be added to improve the melt moldability and the thermal stability. It is preferable to incorporate the phosphorus compound in an amount of 2 to 200 ppm, more preferably 3 to 150 ppm, and most preferably 5 to 100 ppm on the basis of the phosphorus element into the EVOH resin (A). A concentration of the phosphorus in the EVOH of less than 2 ppm or more than 200 ppm may cause a problem in the melt moldability or the thermal stability. In particular, such a concentration easily causes the formation of gel-like seeds or coloring problems when subjected to melt-formation operation over a long period.

The type of phosphorus compound incorporated into the EVOH resin (A) is not limited to particular types. A variety of phosphorous-containing acids such as phosphoric acid and phosphorous acid or salts thereof can be used. Phosphoric acid salts (phosphates) may be in the form of primary phosphates, secondary phosphates, or tertiary phosphates. The cationic species of the phosphates is not specifically defined, but the phosphates are preferably alkali metal salts and alkaline-earth metal salts. Among these, sodium dihydrogenphosphate, potassium dihydrogenphosphate, disodium hydrogenphosphate, or dipotassium hydrogenphosphate is preferable.

When the EVOH resin (A) is a resin composition comprising two or more EVOHs having different melting points, a blending method to obtain the resin composition is not limited to a particular method. Two or more EVOH pellets can be subjected to dry blending, and then the blend can be subjected to melt-forming without other processes before the melt-forming. More preferably, the blend can be kneaded with a banbury mixer, a uniaxial or biaxial screw extruder or the like so as to be formed into pellets, and then subjected to melt-forming. In order to obtain a uniformly dispersed composition and to prevent the formation of or contamination by gels or seeds, it is desirable to use an extruder having a high kneadability in the kneading and pellet-forming processes, to seal the hopper port with nitrogen and to perform extrusion at a low temperature.

As the adhesive resin (B), any resin can be used, as long as it can adhere the EVOH resin (A) layer and the PP resin (C) layer. A polyurethane-based one- or two-component curable adhesive, a polyester-based one- or two-component curable adhesive, or a polyolefin resin modified with carboxylic acid is used preferably.

Among these, it is more preferable to use a polyolefin resin modified with carboxylic acid as the adhesive resin (B) because of its good adhesion with the EVOH resin (A) layer and with the PP resin (C) layer. The polyolefin modified with carboxylic acid is a copolymer including olefin, especially α-olefin and unsaturated carboxylic acid or anhydrides esters, amides, or the like thereof. For example, this is a copolymer based on a polyolefin resin comprising unsaturated carboxylic acid or anhydrides thereof; or a graft polymer obtained by grafting an unsaturated carboxylic acid or an anhydride thereof to a polyolefin resin. The polyolefin which is a base polymer of the polyolefin modified with the carboxylic acid can be various kinds of olefin such as polyethylene (e.g., low density polyethylene (LDPE), linear low density polyethylene (LLDPE), very low density polyethylene (VLDPE) or the like), polypropylene, polypropylene copolymer, an ethylene-vinyl acetate copolymer, or an ethylene-(meth)acrylate copolymer. Among these, it is preferable to use polypropylene as the base polymer because of its good adhesion with the PP resin (C) layer. Examples of the unsaturated carboxylic acid include acrylic acid, methacrylic acid, maleic acid, fumaric acid, and itaconic acid. All or a part of the carboxyl groups contained in the polyolefin resin modified with carboxylic acid can be present in the form of a metal salt.

The content of the unsaturated carboxylic acid or anhydride thereof is preferably 0.5 to 20 mol %, more preferably 2 to 15 mol %, and even more preferably 3 to 12 mol %. Examples of the unsaturated carboxylic acid or anhydrides thereof include acrylic acid, methacrylic acid, ethyl acrylic acid, maleic acid, monomethyl maleate, monoethyl maleate, itaconic acid, itaconic anhydride, and maleic anhydride, and especially maleic anhydride is preferable. Furthermore, a copolymer component other than the unsaturated carboxylic acid or anhydride thereof can be contained. Examples of other copolymer components include vinyl esters such as vinyl acetate and vinyl propionate; unsaturated carboxylic acid esters such as methyl acrylate, ethyl acrylate, isopropyl acrylate, isobutyl acrylate, n-butyl acrylate, 2-ethylhexyl acrylate, methyl methacrylate, isobutyl methacrylate, diethyl maleate; and carbon monoxide.

Product names which are examples of the adhesive resin (B) include CAX-3036 manufactured by Du Pont, Admer manufactured by Mitsui Petrochemical Industries, Ltd. Adtex manufactured by Japan Polyolefin, and Plexer manufactured by USI Corporation.

The MFR of the adhesive resin (B) at 230° C. under a load of 2160 g is preferably about 1 to 50 g/10 min, more preferably about 2 to 10 g/10 min. When the MFR of the adhesive resin (B) is less than about 1 g/10 min, the load applied to an extruder becomes large. When it exceeds about 50 g/10 min, unevenness in flow occurs between the layers, which may makes molding difficult.

The multilayered structure of the present invention is a multilayered structure where the A layer made of the EVOH resin (A) and the C layer made of a highly crystalline PP resin (C) are laminated via the adhesive resin (B).

Specific layer structure of the multilayered structure can be a five layer structure of C/B/A/B/C, a four layer structure of C/B/A/B, or a three layer structure of C/B/A, where A layer, B layer and C layer are represented by A, B and C, respectively. However, the structure is not limited thereto. In addition to these layers, other layers for providing functionality such as heat-sealing properties, anti-static properties, humidity resistance or the like to the multilayered structure can be provided.

In order to provide heat-sealing properties to the multilayered structure, for example, a heat-sealing layer can be provided on the outermost PP layer on one or both sides. When the layer made of a resin with heat-sealing properties is represented by H, examples of the layer structure include H/C/B/A/B/C, H/C/B/A/B/C/H, H/C/B/A/B, H/C/B/A/B/H, and H/C/B/A. Examples of the resin with heat-sealing properties include a random copolymer of propylene and α-olefin having at least 4 carbon atoms; a random copolymer of propylene, α-olefin having at least 4 carbon atoms and ethylene; polyethylene; ethylene-vinyl acetate (EVA) and the like.

In order to provide antistatic properties, at least one C layer can be formed of a mixture comprising the PP resin and one or more antistatic agents, and the surface of this C layer can be treated with corona discharge. Alternatively, the outermost layer on at least one side of the multilayered structure can be coated with a solution containing an antistatic agent.

In order to provide humidity resistance, it is effective to allow at least one PP layer of the multilayered structure to contain one or more of the petroleum resins or the terpene resins that are substantially free from polar groups.

Furthermore, a recovery (Reg) layer can be provided in the above layer structure, if necessary. This recovery layer is formed by utilizing a recovered product made of scraps such as trims that are generated during formation. This recovery layer can be a layer formed only of a recovered product, or can be the PP layer or the adhesive resin layer containing a recovered product. For example, the PP layer containing a small amount of a recovered product has a nature similar to that of the PP layer, so that the layer having the intended nature can be formed inexpensively by reusing the recovered product. Specific examples of the layer structure include Reg/C/B/A/B/C, Reg/C/B/A/B/C/Reg, C/Reg/B/A/B/C, C/Reg/B/A/B/Reg/C, Reg/C/B/AIB, C/Reg/B/A/B, Reg/C/B/A, C/Reg/B/A, and C/B/A/B/Reg, but the layer structure is not limited thereto. In the above layer structure, Reg represents a recovery layer. In the above examples of the layer structure, for example, a layer made of other resins such as polyethylene, polyamide, polyester, or polystyrene can be added. Moreover, the PP layer or the adhesive resin layer can contain small amount of the recovered product. In addition to these layers, a layer for providing functionality such as heat-sealing properties, antistatic properties, and humidity resistance can be provided.

The surface of the multilayered structure can be subjected to a corona discharge treatment or a flame treatment for printing and lamination.

The multilayered structure of the present invention can be used, for example, as an oriented multilayered film by stretching in the following manner or as a container by thermoforming.

When stretching the multilayered structure of the present invention to form an oriented multilayered film, the total thickness after stretching is preferably about 10 µm or more, more preferably about 15 to 100 µm, and even more preferably about 15 to 50 µm.

The thickness of the A layer made of the EVOH resin (A) is preferably about 1 to 20 µm, and more preferably about 4 to 9 µm. When the A layer is thinner than about 1 µm thick, the intended barrier properties can hardly be obtained. When it is more than 20 µm, the rigidity of the obtained oriented film may become poor.

The thickness of the B layer made of the adhesive resin (B) is preferably about 0.5 to 50 µm, more preferably about 2 to 20 µm, and even more preferably 3 to 10 µm. When the B layer is thinner than about 0.5 µm thick, the interlayer adhesion with the layer made of the PP resin (C) and the A layer is not sufficient, so that the multilayered structure having the intended performance may not be obtained. When it is more than 50 µm, the cost becomes high.

The thickness of the C layer made of the polypropylene resin (C) is preferably about 5 to 95 µm, more preferably about 8 to 50 µm, and even more preferably 10 to 30 µm.

The thickness of the Reg layer, if provided, is not limited to a particular thickness.

As a method for producing the multilayered structure of the present invention is not limited to a particular method, general molding methods performed in the field of polyolefin or the like can be used. For example, T-die molding, co-extrusion molding, dry laminate molding, or the like can be used. Among these, co-extrusion molding is preferable.

The multilayered structure of the present invention can be formed, for example, by the following co-extrusion method, and if an oriented film is desired, the obtained multilayered structure is stretched in the following manner. First, the PP resin (C), the adhesive resin (B), and the EVOH resin (A) are introduced to an extrusion die by separate extruders; are laminated in the extrusion die in such a manner that, for example, C/B/A/B/C is achieved; and are co-extruded and cast on a cooling roll at 50° C. or less, preferably 40° C. or less.

The thus obtained multilayered structure is stretched by, for example, a general method such as a sequential biaxial drawing method or a simultaneous biaxial drawing method.

Several processes for producing stretched multilayered structures (stretched films) will be described as follows.

When stretching is performed by the sequential biaxial drawing method, for example, first the PP resin (C), the adhesive resin (B), and the EVOH resin (A) are introduced to an extrusion die by separate extruders; the resins are laminated in the extrusion die in such a manner that C/B/A/B/C is achieved; and then they are co-extruded and cast on a cooling roll. Thus, the multilayered structure is obtained. Then, this is stretched with a roll in the direction along the machine, and is stretched in the transverse direction by a tenter so that the intended oriented multilayered film is produced.

When another embodiment using the sequential biaxial drawing method is employed, the following processes are included. First, the PP resin (C) and the adhesive resin (B) are introduced to an extrusion die by separate extruders; and the resins are laminated in the extrusion die in such a manner that C/B is achieved; and then they are co-extruded and cast on a cooling roll. Thus, a two-layered structure is obtained. Then, this is stretched in the direction along the machine. Thereafter, the A layer made of the EVOH resin (A) or a laminate including the A layer made of the EVOH resin (A) is extruded by separate extruders and laminated on the B layer of the two-layered structure by extrusion-lamination. The obtained laminate is stretched in the transverse direction by a tenter so that the intended oriented multilayered film is produced.

When still another embodiment using the sequential biaxial drawing method is employed, the following processes are included. First, the PP resin (C) is extruded by an extruder, is cast into a sheet on a cooling roll, and is stretched in the direction along the machine. Then, a two-layered structure comprising the B layer made of the adhesive resin (B) and the A layer made of the EVOH resin (A) is extruded by a separate extruder, and then extrusion-lamination is performed so that the B layer of the two-layered structure is laminated on the sheet made of the PP resin. The obtained multilayered structure is stretched in the transverse direction by a tenter so that the intended oriented multilayered film is produced.

When one embodiment using the simultaneous biaxial drawing method is employed, the following processes are included. The PP resin (C), the adhesive resin (B), and the EVOH resin (A) are introduced to a cylindrical extrusion die by separate extruders, and the resins are laminated in the extrusion die in such a manner that C/B/A/B/C is achieved and co-extruded from the die so as to be formed into a tube-shaped laminate. Then, this is stretched in the direction along the machine and in the transverse direction at the same time so that the intended oriented multilayered film is produced.

When another embodiment using the simultaneous biaxial drawing method is employed, the following processes are included. The PP resin (C), the adhesive resin (B), and the EVOH resin (A) are introduced to an extrusion die by separate extruders, and the resins are laminated in the extrusion die in such a manner that C/B/A/B/C is achieved and are co-extruded and cast on a cooling roll, so that a multilayered structure is produced. Then, this is stretched in the direction along the machine and in the transverse direction by a tenter at the same time so that the intended oriented multilayered film is produced.

The above layer structures are only illustrative, and the present invention is not limited thereto.

Hereinafter, preferable methods and conditions for producing the multilayered structure will be described more specifically, in the case where it is the oriented multilayered film as described above.

As a first method, the sequential biaxial drawing of the simultaneously co-extruded multilayered structure will be described. First, the PP resin (C), the adhesive resin (B), and the EVOH resin (A) are introduced to an extrusion die by separate extruders; the resins are laminated in the extrusion die in such a manner that, for example, C/B/A/B/C is achieved; and then the resins are co-extruded and cast on a cooling roll at about 50° C. or less, preferably about 40° C. or less. Thus, the multilayered structure is produced. Then, this is stretched to about 4 to 7 times larger, preferably about 5 to 6 times larger, in the direction along the machine at about 100 to 140° C., preferably about 110 to 130° C. Thereafter, it is heated at a preheating temperature of about 180 to 200° C., preferably about 185 to 195° C., and is stretched to about 7 to 12 times larger, preferably about 8 to 10 times larger, in the transverse direction at about 160 to 175° C., preferably about 165 to 170° C., so that the intended oriented multilayered film is produced.

As a second method, the sequential biaxial drawing using extrusion-coating will be described. First, the PP resin (C) and the adhesive resin (B) are introduced to an extrusion die by separate extruders, and the resins are laminated in the extrusion die in such a manner that, for example, C/B is achieved and are co-extruded and cast on a cooling roll at about 50° C. or less, preferably about 40° C. or less. Thus, the two-layered structure is produced. Then, this is stretched to about 4 to 7 times larger, preferably about 5 to 6 times larger in the direction along the machine at about 100 to 140° C., preferably about 110 to 130° C. Then, for example, the EVOH is extruded and laminated on the adhesive layer of the two-layered structure by a separate extruder. Thereafter, it is heated at a preheating temperature of about 180 to 200° C., preferably about 185 to 195° C., and is stretched to about 7 to 12 times larger, preferably about 8 to 10 times larger, in the transverse direction at about 160 to 175° C., preferably about 165 to 170° C., so that the intended oriented multilayered film is produced.

As a third method, the simultaneous biaxial drawing will be described. First, the PP resin (C), the adhesive resin (B), and the EVOH resin (A) are introduced to a cylindrical extrusion die by separate extruders; the resins are laminated in the extrusion die in such a manner that, for example, C/B/A/B/C is achieved; and then they are co-extruded from the extrusion die and cooled with cooling water at about 50° C. or less, preferably about 40° C. or less, so that a tube-shaped laminate is obtained. Then, the laminate is heated with a circular infrared ray heater, and the tube-shaped laminate is expanded to a bubble shape by blowing pressurized air so as to be stretched to about 4 to 7 times larger, preferably about 5 to 6 times larger, in the direction along the machine and to about 4 to 7 times larger, preferably about 5 to 6 times larger, in the transverse direction at the same time so that the intended oriented multilayered film is produced.

As a fourth method, the simultaneous biaxial drawing using a tenter will be described. First, the PP resin (C), the adhesive resin (B), and the EVOH resin (A) are introduced to an extrusion die by separate extruders; the resins are laminated in the extrusion die in such a manner that, for example, C/B/A/B/C is achieved; and then they are co-extruded from the die and cast on a cooling roll at about 50° C. or less, preferably about 40° C. or less, so that a multilayered structure is obtained. Then, it is heated in a tenter at a preheating temperature of about 180 to 200° C., preferably about 185 to 195° C., and is stretched to about 4 to 12 times larger, preferably about 5 to 10 times larger, in the direction along the machine and to about 4 to 12 times larger, preferably about 5 to 10 times larger, in the transverse direction at the same time at about 160 to 175° C., preferably about 165 to 170° C., so that the intended oriented multilayered film is produced.

In the case where the multilayered structure of the present invention is used as a multilayered structure for thermoforming, the thickness of the multilayered structure before thermoforming is not limited to a particular thickness. In general, it is preferable that the thickness of the EVOH layer makes up 2 to 20% of the total thickness of the multilayered structure in view of the moldability, the cost or the like. More specifically, it is preferable that the total thickness is 300 to 3000 $\mu$m, and the thickness of the EVOH layer is 10 to 500 $\mu$m.

"Thermoforming" used in the specification of the present invention refers to a process where a sheet or the like is heated to be softened, and then formed into a shape of a mold. Examples of the molding method include a method of forming into a shape of a mold using a vacuum or compressed air and, if necessary, a plug (e.g., a straight method, a drape method, an air-slip method, a snapback method, a plug-assist method or the like), a method of press-molding and the like. The molding conditions such as the molding temperature, the vacuum degree, the pressure of the compressed air, the molding rate or the like can be set suitably, depending on the plug shape, the mold shape, the nature of the raw material sheet or the like.

The temperature at which the obtained multilayered structure is thermoformed is not limited to a particular temperature, and any temperatures at which the resin can be softened sufficiently for molding can be used.

For example, in thermoforming a sheet, it is desired not to raise the temperature to such a high temperature that the sheet is molten by heating or that the roughness on the metal surface of the heater plate is transferred into the film. In addition, it is desired not to reduce the temperature to such a low temperature that the shape is not sufficiently provided. More specifically, the sheet temperature is preferably 140 to 195° C., more preferably 145 to 185° C., and even more preferably 150 to 180° C.

A preferable shape of a container obtained by thermoforming the multilayered structure comprising the layer made of PP as described above, especially the sheet-like multilayered structure, satisfies the following conditions:

$$S \leq T/t \leq 20S \quad (2.1)$$

$$300 \leq T \leq 3000 \quad (2.2)$$

$$t \geq 100 \quad (2.3)$$

where T is the total thickness ($\mu$m) of all the layers in the thickest portion of the container, t is the total thickness ($\mu$m) of all the layers in the thinnest portion of the container, and S is the draw ratio of the container where S is expressed by Equation (2.4):

$$S = \text{(the depth of the container)/(the diameter of the circle having the largest diameter that can be inscribed in the opening of the container)} \quad (2.4)$$

The equations (2.1) to (2.3) are more preferably, $$1.5S \leq T/t \leq 15S \quad (2.1.1)$$

$$500 \leq T \leq 2000 \quad (2.2.1)$$

$$t \geq 200 \quad (2.3.1);$$

and even more preferably, $$2S \leq T/t \leq 10S \quad (2.1.2)$$

$$800 \leq T \leq 1500 \quad (2.2.2)$$

$$t \geq 300 \quad (2.3.2)$$

In the above equations, when T/t is as large as more than 20S, unevenness in the thickness of the container is significant so that it does not result in a preferable shape. When the total thickness (T) of all the layers in the thickest portion exceeds 3000 μm, the weight of the container is larger than necessary, so that it is not preferable because of not only its cost but also the difficulty of molding. When T is less than 300 μm, the molded container is too thin, so that the rigidity is not sufficient. The total thickness (t) of all the layers in the thinnest portion of less than 100 μm is not preferable also for the same reasons. When T/t is less than S, drawing is shallow, so that it is possible to perform thermoforming without using the specific structure of the present invention. However, the structure of the present invention easily allows thermoforming, even if T/t exceeds S. A large advantage of the present invention is that it also can provide a thermoformed container having a good appearance under such deep drawing conditions.

As described above, the multilayered structure of the present invention obtained by using polypropylene having a stereoregularity index [M5] and a MFR in specific ranges and the EVOH resin having an ethylene content and a saponification degree in specific ranges has excellent stretchability, thermoformability, and mechanical properties, high gas barrier properties under high humidity, a good appearance and excellent transparency. Therefore, such a multilayered structure can be utilized as, for example, a multilayered oriented film or a thermoformed container. The multilayered structure is especially suitable for films for packaging products whose quality can deteriorate by the presence of oxygen, such as food, medicines, agricultural chemicals or the like, a packaging container or a storage container (e.g., cups for pudding, jelly, yogurt, juice, fermented soybean paste, etc.). The multilayered structure of the present invention can be produced inexpensively and does not generate toxic gas when it is burned, and therefore can be used in a wide range of applications including food packaging and medicine packaging.

EXAMPLES

Hereinafter, the present invention will be described by way of examples, but is not limited thereto.

The testing methods in the following examples are as follows:
(1) Calculation of the Stereoregularity Index [M5] of the PP Resin (C)
(1.1) First Method (Used in Examples 1 to 12 and Comparative Examples 1 to 12)

First, 3 g of polypropylene resin, 20 g of 2,6-di-tert-butyl-4-methylphenol, and 500 ml of n-decane were put into a flask with a stirring device and heated at 145° C. to become molten. After the resin was dissolved, the mixture was cooled to room temperature slowly and held in a water bath at 23° C. for 8 hours or more. An n-decane suspension containing a precipitated polymer (23° C., n-decane insoluble component) was separated by filtration with a glass filter (G-4). The obtained solid was dried under reduced pressure, and then was subjected to Soxhler extraction with heptane for at least 6 hours. The resultant was dried so that a boiling heptane insoluble component was obtained.

Then, 0.35 g of the obtained boiling heptane insoluble component was dissolved in 2.0 ml of hexachlorobutadiene and was filtered with a glass filter (G-2). To this, 0.5 ml of deuterated benzene was added, and the mixture was put into a tube having an inner diameter of 10 mm for NMR measurement. Then, $^{13}$C-NMR measurement was performed at 120° C. with a GX-500 type apparatus for NMR measurement manufactured by Nippon Electronics Co., Ltd. The cumulative number of times as 1000 or more. The stereoregularity index [M5] was calculated with the ratio of the absorption intensity (the integrated value of the peak intensity) (Pmmmm) in the $^{13}$C-NMR spectrum derived from methyl groups, each of the methyl groups being the third unit of the five consecutive propylene units (mmmm) to the absorption intensity (the integrated value of the peak intensity) (Pw) derived from all the methyl groups of the propylene units obtained by the above measurement.
(1.2) Second Method (Used in Examples 13 to 16 and Comparative Examples 13 to 16)

First, 6 g of polypropylene resin, 40 g of 2,6-di-tert-butyl-4-methylphenol, and 1000 ml of n-decane were put into a flask with a stirring device and heated at 145° C. to become molten. After the resin was dissolved, the mixture was cooled to room temperature and held in a water bath at 20° C. for 10 hours. An n-decane suspension containing a precipitated polymer (20° C., n-decane insoluble component) was separated by filtration with a glass filter (G-4). The obtained solid was dried under reduced pressure, and then was subjected to Soxhler extraction with heptane for 8 hours. The resultant was dried so that a boiling heptane insoluble component was obtained.

Then, 0.5 g of the obtained boiling heptane insoluble component was dissolved in 4.0 ml of hexachlorobutadiene, and was filtered with a glass filter (G-2). To this, 0.5 ml of deuterated benzene was added, and the mixture was put into a tube having an inner diameter of 10 mm for NMR measurement. Then, $^{13}$C-NMR measurement was performed at 120° C. with a GX-500 type apparatus for NMR measurement manufactured by Nippon Electronics Co., Ltd. The cumulative number of times was 1000 or more. The stereoregularity index [M5] was calculated with the ratio of the absorption intensity (the integrated value of the peak intensity) in the $^{13}$C-NMR spectrum derived from methyl groups, each of the methyl groups being the third unit of the five consecutive propylene units (mmmm) to the absorption intensity (the integrated value of the peak intensity) derived from all the methyl groups of the propylene units obtained by the above measurement.
(2) Stretchability of Films (in the Case of Simultaneous Co-extrusion Molding)

The state at the time of stretching the multilayered structure (multilayered film) and the state of the obtained oriented multilayered film were visually evaluated in three grades.
◯: Stretchable
Δ: Partial unevenness in stretching, but stretchable
×: Failure to stretch (ruptured)
(3) Stretchability of Films (in the Case of Extrusion-coating)

The state at the time of stretching the multilayered structure (multilayered film) and the state of the obtained oriented multilayered film were visually evaluated in three grades.
◯: Stretchable
Δ: Partial unevenness in stretching, but stretchable
×: Failure to stretch
(4) Appearance of Films The state of the produced multilayered structure (multilayered film) was visually evaluated and the haze of the film was measured and evaluated.

The results of the visual evaluation were classified in the following three grades.

○: Transparent film

Δ: Obscure glass-like (matte) film

×: Meshed opaque film

The measurement of the haze was performed similar to the method described in JIS K7150 with a haze meter 300 A manufactured by Nihon Densyoku Kogyo. The value was taken at the measurement of four films overlapped.

(5) Oxygen Permeability (5.1) Oxygen Permeability of an Oriented Film

Measurement was performed similar to the method described in JIS K7126 (isopiestic method) at 20° C. under high humidity of 85%RH and 95%RH with a MOCONOX-TRAN2/20 type apparatus for measuring a permeated oxygen amount manufactured by MODERN CONTROLS INC. Sample films were allowed to stand in an atmosphere of above-mentioned temperature and humidity for two weeks for humidity conditioning. Samples obtained by stretching to 5×10 times larger in the case of an oriented film having a C/B/A/B/C structure and samples obtained by stretching to 11 times larger in the case of an oriented film having a C/B/A structure were evaluated. "Oxygen permeability" herein refers to the following value. The amount (cc/m$^2$·day·atm) of oxygen permeated through the oriented multilayered film having the C/B/A/B/C structure or the C/B/A structure was measured, and the amount of oxygen permeated through the film when the thickness of the EVOH of the oriented multilayered film is 20 μm (cc·20 μm/m$^2$·day atm) is calculated, based on the measured amount of the permeated oxygen. This value (cc·20 μm/m$^2$·day·atm) is referred to as the oxygen permeability. (5.2) Oxygen permeability of a thermoformed container A part of the multilayered structure for thermoforming was cut out, and was measured similar to the method described in JIS K7126 (isopiestic method) at 20° C. under a humidity of 85%RH with a MOCON OX-TRAN2/20 type apparatus for measuring a permeated oxygen amount manufactured by MODERN CONTROLS INC. "Oxygen permeability" herein refers to the following value. The amount (cc/m$^2$·day·atm) of oxygen permeated through the thermoformed product was measured, and the amount of oxygen permeated through the thermoformed product when the thickness of the EVOH of the thermoformed product is 20 μm (cc·20 μm/m$^2$·day ·atm) is calculated, based on the above measured amount of the permeated oxygen. This value (cc·20 μm/m$^2$·day·atm) is referred to as the oxygen permeability.

(6) Appearance of a Thermoformed Container

The appearance of cups (i.e., containers obtained by thermoforming) was visually observed, and formabilities, generation of cracks and generation of wave patterns were evaluated. The formabilities were evaluated by visually determining whether or not the corners (the intersections of the side faces and the bottom face) were formed precisely, and all the samples for evaluation were classified in four grades (good: A>B>C>D: poor). The generation of cracks was evaluated by visually determining whether or not a crack about 2 mm long is generated in the vicinity of the bottom portion of the side face, and all the samples for evaluation were classified in four grades (good: A>B>C>D: poor) by the level of conspicuousness of the crack. The generation of wave patterns was evaluated by visually determining the nonuniformity due to wave patterns generated primarily in the side faces of the cup, and all the samples for evaluation were classified in four grades (good: A>B>C>D: poor) by the level of conspicuousness thereof.

Furthermore, the thickness of the thinnest portion was obtained by measuring the thickness of the thinnest portion in the vicinity of the intersections of the bottom face and the side faces of the molded product.

(7) Drop Test

Water in an amount of 200 cc was poured in a cup molded at 160° C., and another cup of the same type was put on the cup upside down to close the openings of the cups. The opening portions were then adhered by a heat-press process. This test sample container was dropped onto a concrete floor, and the height needed for the container to break (allowing the water inside to leak) was measured. This test was repeated for 30 samples, and the results are calculated according to the method for calculation shown in JIS test method ("8. Calculation" section of K7211) to obtain the height for 50% of the samples to break.

Example 1

EVOH (A1) having an ethylene content of 47 mol %, a saponification degree of 99.6% and a MFR of 13 g/10 min (210° C., a load of 2160 g), highly crystalline polypropylene (C1) having a stereoregularity index [M5] of 0.98 and a MFR of 2 g/10 min (210° C., a load of 2160 g), and polypropylene resin modified with maleic anhydride (B1) (adhesive resin) having a MFR of 6.0 g/10 min (210° C., a load of 2160 g) were introduced to an extrusion die by separate extruders. The resins were laminated in the extrusion die in such a manner that the structure of C/B/A/B/C was achieved, and were co-extruded and cast on a cooling roll at 35° C. so that a multilayered structure (laminated sheet) was produced (in the above structure, A, B and C represent an EVOH resin (A) layer, an adhesive resin (B) layer and a polypropylene resin (C) layer, respectively; this also applies to the following examples and comparative examples). Then, the multilayered structure was stretched to 5 to 6 times larger in the direction along the machine at 120° C. and then heated at a preheating temperature of 185° C. Then, it was stretched to 8 to 10 times larger in the transverse direction at 165° C. so that the intended multilayered film was produced. Thereafter, evaluation was performed with respect to the items described above. Table 1 shows the results. Table 1 shows also the results of Examples 2, 3 and 7 to 12 and Comparative Examples 1 to 3 and 7 to 12, which will be described below.

Example 2

EVOH (A2) having an ethylene content of 44 mol %, a saponification degree of 99.5% and a MFR of 13 g/10 min (210° C., a load of 2160 g), highly crystalline polypropylene (C1) having a stereoregularity index [M5] of 0.98 and a MFR of 2 g/10 min (210° C., a load of 2160 g), and polypropylene resin modified with maleic anhydride (B1) having a MFR of 6 g/10 min (210° C., a load of 2160 g) were introduced to an extrusion die by separate extruders. The resins were laminated in the extrusion die in such a manner that the structure of C/B/A/B/C was achieved, and were co-extruded and cast on a cooling roll at 35° C. so that a laminated sheet was produced. Then, the laminated sheet was stretched to 5 to 6 times larger in the direction along the machine at 120° C. and then heated at a preheating temperature of 190° C. Then, it was stretched to 8 to 10 times larger in the transverse direction at 170° C. so that the intended multilayered film was produced. Thereafter, this film was evaluated with respect to the items described above.

Example 3

As EVOH resin (A3), a mixture of the following two EVOH resins (a3.1) and (a3.2) was used.

EVOH resin (a3.1) had an ethylene content of 38 mol %, a saponification degree of 99.6%, a MFR of 3.8 g/10 min (210° C., 2160 g), and a melting point of 175° C.; and contained a phosphorus compound (potassium dihydrogenphosphate) in an amount of 100 ppm on the basis of the phosphorus element and a sodium salt (sodium acetate) in an amount of 50 ppm on the basis of the sodium element.

EVOH resin (a3.2) had an ethylene content of 48 mol %, a saponification degree of 99.6%, a MFR of 33 g/10 min (210° C., 2160 g), and a melting point of 160° C.; and contained a phosphorus compound (potassium dihydrogen phosphate) in an amount of 50 ppm on the basis of the phosphorus element.

The EVOH resins (a3.1) and (a3.2) were blended in an amount of 50 parts by weight each, and the blend was melt-extruded with a screw having a Madox type kneading section with a diameter of 40 mm, L/D=24, and a compression ratio of 3.8 to form pellets of a resin composition (i.e., EVOH resin (A3)). The obtained EVOH resin (A3) had an ethylene content of 43 mol %, a saponification degree of 99.6% and a MFR of 7.7 g/10 min (210° C., 2160 g).

This EVOH (A3), highly crystalline polypropylene (C1) having a stereoregularity index [M5] of 0.98 and a MFR of 2 g/10 min (210° C., a load of 2160 g), and polypropylene resin modified with maleic anhydride (B1) having a MFR of 6 g/10 min (210° C., a load of 2160 g) were introduced to an extrusion die by separate extruders. The resins were laminated in the extrusion die in such a manner that the structure of C/B/A/B/C was achieved and were co-extruded and cast on a cooling roll at 35° C. so that a laminated sheet was produced. Then, the laminated sheet was stretched to 5 to 6 times larger in the direction along the machine at 120° C., and then heated at a preheating temperature of 195° C. Then, it was stretched to 8 to 10 times larger in the transverse direction at 170° C. so that the intended multilayered film was produced. Thereafter, this film was evaluated with respect to the items described above.

Example 4

Highly crystalline polypropylene (C1) having a stereoregularity index [M5] of 0.98 and a MFR of 2 g/10 min (210° C., a load of 2160 g), and polypropylene resin modified with maleic anhydride (B1) having a MFR of 6 g/10 min (210° C., a load of 2160 g) were introduced to an extrusion die by separate extruders. The resins were laminated in the extrusion die in such a manner that the structure of the high crystalline polypropylene/the adhesive resin was achieved and were co-extruded and cast on a cooling roll at 35° C. or less so that a two-layered laminated sheet having a polypropylene layer and an adhesive layer was produced. Then, the laminated sheet was stretched to 5 to 6 times larger in the direction along the machine at 115° C. Then EVOH (A1) having an ethylene content of 47 mol %, a saponification degree of 99.6% and a MFR of 13 g/10 min (210° C., a load of 2160 g) was extruded by a separate extruder to be laminated on the adhesive layer of the two-layered laminated sheet. Thereafter, the resultant laminate was heated at a preheating temperature of 185° C. Then, it was stretched to 8 to 10 times larger in the transverse direction at 165° C. so that the intended multilayered film was produced. Thereafter, this multilayered film was evaluated with respect to the items described above. Table 2 shows the results. Table 2 shows also the results of Examples 5 and 6 and Comparative Examples 4 to 6, which will be described below.

Example 5

Highly crystalline polypropylene (C1) having a stereoregularity index [M5] of 0.98 and a MFR of 2 g/10 min (210° C., a load of 2160 g), and polypropylene resin modified with maleic anhydride (B1) having a MFR of 6 g/10 min (210° C., a load of 2160 g) were introduced to an extrusion die by separate extruders. The resins were laminated in the extrusion die in such a manner that the structure of the high crystalline polypropylene/the adhesive resin was achieved, and were co-extruded and cast on a cooling roll at 35° C. so that a two-layered laminated sheet having a polypropylene layer and an adhesive layer was produced. Then, the laminated sheet was stretched to 5 to 6 times larger in the direction along the machine at 115° C. Then, EVOH (A2) having an ethylene content of 44 mol %, a saponification degree of 99.5% and a MFR of 13 g/10 min (210° C., a load of 2160 g) was extruded by a separate extruder to be laminated on the adhesive layer of the two-layered laminated sheet. Thereafter, the resultant laminate was heated at a preheating temperature of 190° C. Then, it was stretched to 8 to 10 times larger in the transverse direction at 170° C. so that the intended multilayered film was produced. Thereafter, this multilayered film was evaluated with respect to the items described above.

Example 6

Highly crystalline polypropylene (C1) having a stereoregularity index [M5] of 0.98 and a MFR of 2 g/10 min (210° C., a load of 2160 g), and polypropylene resin modified with maleic anhydride (B1) having a MFR of 6 g/10 min (210° C., a load of 2160 g) were introduced to an extrusion die by separate extruders. The resins were laminated in the extrusion die in such a manner that the structure of the high crystalline polypropylene/the adhesive resin was achieved, and were co-extruded and cast on a cooling roll at 35° C. so that a two-layered laminated sheet having a polypropylene layer and an adhesive layer was produced. Then, the laminated sheet was stretched to 5 to 6 times larger in the direction along the machine at 115° C. Then, the EVOH (A3) prepared in Example 3 that is a blend of the two EVOHs was extruded by a separate extruder to be laminated on the adhesive layer of the two-layered laminated sheet. Thereafter, the resultant laminate was heated at a preheating temperature of 195° C. Then, it was stretched to 8 to 10 times larger in the transverse direction at 170° C. so that the intended multilayered film was produced. Thereafter, this multilayered film was evaluated with respect to the items described above.

Example 7

EVOH (A1) having an ethylene content of 47 mol %, a saponification degree of 99.6% and a MFR of 13 g/10 min (210° C., a load of 2160 g), highly crystalline polypropylene (C1) having a stereoregularity index [M5] of 0.98 and a MFR of 2 g/10 min (210° C., a load of 2160 g), and polypropylene resin modified with maleic anhydride (B1) having a MFR of 6 g/10 min (210° C., a load of 2160 g) were introduced to a cylindrical extrusion die by separate extruders. The resins were laminated in the extrusion die in such a manner that the structure of C/B/A/B/C was achieved and were co-extruded from the extrusion die and cooled with water at 30° C. so that a tube-shaped laminate was produced. Then, the tube-shaped laminate was heated by a circular infrared ray heater that was set at a heating temperature of 380° C., and then the laminate was expanded to a bubble shape by blowing pressurized air so as to be stretched simultaneously to 5.0 to 6.0 times larger in the direction along the machine and to 5.0 to 6.0 times larger in the transverse direction so that the intended multilayered film was produced. Thereafter, this multilayered film was evaluated with respect to the items described above.

Example 8

EVOH (A2) having an ethylene content of 44 mol %, a saponification degree of 99.5% and a MFR of 13 g/10 min (210° C., a load of 2160 g), highly crystalline polypropylene (C1) having a stereoregularity index [M5] of 0.98 and a MFR of 2 g/10 min (210° C., a load of 2160 g), and polypropylene resin modified with maleic anhydride (B1) having a MFR of 6 g/10 min (210° C., a load of 2160 g) were introduced to a cylindrical extrusion die by separate extruders. The resins were laminated in the extrusion die in such a manner that the structure of C/B/A/B/C was achieved, and were co-extruded from the extrusion die and cooled with water at 30° C. so that a tube-shaped laminate was produced. Then, the tube-shaped laminate was heated by a circular infrared ray heater that was set at a heating temperature of 390° C., and then the laminate was expanded to a bubble shape by blowing pressurized air so as to be stretched simultaneously to 5.0 to 6.0 times larger in the direction along the machine and to 5.0 to 6.0 times larger in the transverse direction so that the intended multilayered film was produced. Thereafter, this multilayered film was evaluated with respect to the items described above.

Example 9

The EVOH (A3) prepared in Example 3 that is a blend of the two EVOHs, highly crystalline polypropylene (C1) having a stereoregularity index [M5] of 0.98 and a MFR of 2 g/10 min (210° C., a load of 2160 g), and polypropylene resin modified with maleic anhydride (B1) having a MFR of 6 g/10 min (210° C., a load of 2160 g) were introduced to a cylindrical extrusion die by separate extruders. The resins were laminated in the extrusion die in such a manner that the structure of C/B/A/B/C was achieved and were co-extruded from the extrusion die and cooled with water at 30° C. so that a tube-shaped laminate was produced. Then, the tube-shaped laminate was heated by a circular infrared ray heater that was set at a heating temperature of 400° C., and then the laminate was expanded to a bubble shape by blowing pressurized air so as to be stretched simultaneously to 5.0 to 6.0 times larger in the direction along the machine and to 5.0 to 6.0 times larger in the transverse direction so that the intended multilayered film was produced. Thereafter, this multilayered film was evaluated with respect to the items described above.

Example 10

EVOH (A1) having an ethylene content of 47 mol %, a saponification degree of 99.6% and a MFR of 13 g/10 min (210° C., a load of 2160 g), highly crystalline polypropylene (C1) having a stereoregularity index [M5] of 0.98 and a MFR of 2 g/10 min (210° C., a load of 2160 g), and polypropylene resin modified with maleic anhydride (B1) having a MFR of 6.0 g/10 min (210° C., a load of 2160 g) were introduced to an extrusion die by separate extruders. The resins were laminated in the extrusion die in such a manner that the structure of C/B/A/B/C was achieved and were co-extruded and cast on a cooling roll at 35° C. so that a laminated sheet was produced. Then, the laminate sheet was heated at a preheating temperature of 185° C. in a tenter, and then stretched simultaneously to 5 to 6 times larger in the direction along the machine and to 9 to 10 times larger in the transverse direction at 165° C. so that the intended multilayered film was produced. Thereafter, this multilayered film was evaluated with respect to the items described above.

Example 11

EVOH (A2) having an ethylene content of 44 mol %, a saponification degree of 99.5% and a MFR of 13 g/10 min (210° C., a load of 2160 g), highly crystalline polypropylene (C1) having a stereoregularity index [M5] of 0.98 and a MFR of 2 g/10 min (210° C., a load of 2160 g), and polypropylene resin modified with maleic anhydride (B1) having a MFR of 6 g/10 min (210° C., a load of 2160 g) were introduced to an extrusion die by separate extruders. The resins were laminated in the extrusion die in such a manner that the structure of C/B/A/B/C was achieved, and were co-extruded and cast on a cooling roll at 35° C. so that a laminated sheet was produced. Then, the laminate sheet was heated at a preheating temperature of 190° C. in a tenter, and then stretched simultaneously to 5 to 6 times larger in the direction along the machine and to 9 to 10 times larger in the transverse direction at 170° C. so that the intended multilayered film was produced. Thereafter, this multilayered film was evaluated with respect to the items described above.

Example 12

The EVOH (A3) prepared in Example 3 that is a blend of the two EVOHs, highly crystalline polypropylene (C1) having a stereoregularity index [M5] of 0.98 and a MFR of 2 g/10 min (210° C., a load of 2160 g), and polypropylene resin modified with maleic anhydride (B1) having a MFR of 6 g/10 min (210° C., a load of 2160 g) were introduced to an extrusion die by separate extruders. The resins were laminated in the extrusion die in such a manner that the structure of C/B/A/B/C was achieved and were co-extruded and cast on a cooling roll at 35° C. so that a laminated sheet was produced. Then, the laminate sheet was heated at a preheating temperature of 195° C. in a tenter, and then stretched simultaneously to 5 to 6 times larger in the direction along the machine and to 9 to 10 times larger in the transverse direction at 170° C. so that the intended multilayered film was produced. Thereafter, this multilayered film was evaluated with respect to the items described above.

Comparative Examples 1 to 12

Comparative Examples 1 to 12 are the same as Examples 1 to 12, respectively, except that polypropylene (C2) having a stereoregularity index [M5] of 0.92 and a MFR of 2 g/10 min (210° C., a load of 2160 g) was used in place of the highly crystalline polypropylene (C1).

TABLE 1

Simultaneous co-extrusion molding (Layer structure: C/B/A/B/C)

| | Polypropylene | | EVOH | | | | | | |
| --- | --- | --- | --- | --- | --- | --- | --- | --- | --- |
| | [M5] | MFR*a | Ethylene content (mol %) | Saponification degree (%) | Stretchability | Appearance of films | Transparency (Haze) | Oxygen permeability*b | Oxygen permeability*c |
| Example 1 | 0.98 | 2 g/10 min | 47 | 99.6 | ○ | ○ | 4 | 25 | 50 |
| Example 2 | 0.98 | 2 g/10 min | 44 | 99.5 | ○ | ○ | 5 | 17 | 25 |
| Example 3 | 0.98 | 2 g/10 min | 43*d | 99.6 | ○ | ○ | 7 | 7 | 15 |
| Example 7 | 0.98 | 2 g/10 min | 47 | 99.6 | ○ | ○ | 4 | 25 | 50 |
| Example 8 | 0.98 | 2 g/10 min | 44 | 99.5 | ○ | ○ | 5 | 17 | 25 |
| Example 9 | 0.98 | 2 g/10 min | 43*d | 99.6 | ○ | ○ | 7 | 7 | 15 |
| Example 10 | 0.98 | 2 g/10 min | 47 | 99.6 | ○ | ○ | 4 | 25 | 50 |
| Example 11 | 0.98 | 2 g/10 min | 44 | 99.5 | ○ | ○ | 5 | 17 | 25 |
| Example 12 | 0.98 | 2 g/10 min | 43*d | 99.6 | ○ | ○ | 7 | 7 | 15 |
| Comparative example 1 | 0.92 | 2 g/10 min | 47 | 99.6 | Δ | Δ | 30 | —*e | —*e |
| Comparative example 2 | 0.92 | 2 g/10 min | 44 | 99.5 | X | X | — | —*e | —*e |
| Comparative example 3 | 0.92 | 2 g/10 min | 43*d | 99.6 | X | X | — | —*e | —*e |
| Comparative example 7 | 0.92 | 2 g/10 min | 47 | 99.6 | Δ | Δ | 30 | —*e | —*e |
| Comparative example 8 | 0.92 | 2 g/10 min | 44 | 99.5 | X | X | — | —*e | —*e |
| Comparative example 9 | 0.92 | 2 g/10 min | 43*d | 99.6 | Δ | Δ | — | —*e | —*e |
| Comparative example 10 | 0.92 | 2 g/10 min | 47 | 99.6 | X | X | 30 | —*e | —*e |
| Comparative example 11 | 0.92 | 2 g/10 min | 44 | 99.5 | X | X | — | —*e | —*e |
| Comparative example 12 | 0.92 | 2 g/10 min | 43*d | 99.6 | X | X | — | —*e | —*e |

*aMFR at 230° C. under a load of 2160 g
*bMeasurement conditions: 20° C., 85% RH, 2 weeks for humidity conditioning; unit: cc · 20μ/m² · day · atm
*cMeasurement conditions: 20° C., 95% RH, 2 weeks for humidity conditioning; unit: cc · 20μ/m² · day · atm
*dA mixture comprising equal amounts of EVOHs having ethylene contents 38 mol % and 48 mol %, respectively
*eFailure to measure due to poor formation and poor appearance

TABLE 2

Extrusion-coating (Layer structure: A/B/C)

| | Polypropylene | | EVOH | | | | | | |
| --- | --- | --- | --- | --- | --- | --- | --- | --- | --- |
| | [M5] | MFR*a | Ethylene content (mol %) | Saponification degree (%) | Stretchability | Appearance of films | Transparency (Haze) | Oxygen permeability*b | Oxygen permeability*c |
| Example 4 | 0.98 | 2 g/10 min | 47 | 99.6 | ○ | ○ | 4 | 25 | 50 |
| Example 5 | 0.98 | 2 g/10 min | 44 | 99.5 | ○ | ○ | 5 | 17 | 25 |
| Example 6 | 0.98 | 2 g/10 min | 43*d | 99.6 | ○ | ○ | 7 | 7 | 15 |
| Comparative example 4 | 0.92 | 2 g/10 min | 47 | 99.6 | Δ | Δ | 30 | —*e | —*e |
| Comparative example 5 | 0.92 | 2 g/10 min | 44 | 99.5 | X | X | — | —*e | —*e |
| Comparative example 6 | 0.92 | 2 g/10 min | 43*d | 99.6 | X | X | — | —*e | —*e |

*aMFR at 230° C. under a load of 2160 g
*bMeasurement conditions: 20° C., 85% RH, 2 weeks for humidity conditioning; unit: cc · 20μ/m² · day · atm
*cMeasurement conditions: 20° C., 95% RH, 2 weeks for humidity conditioning; unit: cc · 20μ/m² · day · atm
*dA mixture comprising equal amounts of EVOHs having ethylene contents 38 mol % and 48 mol %, respectively
*eFailure to measure due to poor formation and poor appearance The films of the above examples obtained by using polypropylene having a stereoregularity index [M5] within a specific range have excellent stretchability and high gas barrier properties under high humidity. In addition, they have good appearances and excellent transparency. On the other hand, the films of the comparative examples obtained by using polypropylene having a stereoregularity index [M5] outside of the specific range have poor stretchability and are unsatisfactory molded products. In addition, they have poor appearances and poor transparency.

Example 13

The following two EVOH resins (a4.1) and (a4.2) in an amount of 50 parts by weight each were dry-blended, and then the blend was melt-extruded with a screw having a Madox type kneading section with a diameter of 40 mm, L/D=24, and a compression ratio of 3.8 to form pellets of the EVOH resin mixture (EVOH resin (A4)).

EVOH resin (a4.1) had an ethylene content of 27 mol %, a saponification degree of 99.6% and a MFR of 3.9 g/10 min (210° C., 2160 g); and contained a phosphorus compound (potassium dihydrogen phosphate) in an amount of 100 ppm on the basis of the phosphorus element, and a sodium salt (sodium acetate) in an amount of 10 ppm on the basis of the sodium element.

EVOH resin (a4.2) had an ethylene content of 38 mol %, a saponification degree of 99.6% and a MFR of 3.8 g/10 min (210° C., 2160 g); and contained a phosphorus compound (potassium dihydrogen phosphate) in an amount of 100 ppm on the basis of the phosphorus element, and a sodium salt (sodium acetate) in an amount of 50 ppm on the basis of the sodium element.

This EVOH resin (A4), polypropylene resin (C3) having a stereoregularity index [M5] of 0.99, and polypropylene resin modified with maleic anhydride which is an adhesive resin (B2) (Adomer QF500 manufactured by Mitsui Petrochemical Industries, Ltd.) were fed into separate extruders and co-extruded by a co-extruder provided with a T-die, so that a multilayered sheet having a total thickness of 1000 $\mu$m and a structure of three kinds and five layers (C/B/A/B/C= 400 $\mu$m/50 $\mu$m/100 $\mu$m/50 $\mu$m/400 $\mu$m) was obtained. In the co-extrusion process, the PP resin (C3) was kneaded in an extruder provided with a uniaxial screw having a diameter of 65 mm and L/D=22 at 200 to 240° C. The adhesive resin (B2) was kneaded in an extruder provided with a uniaxial screw having a diameter of 40 mm and L/D=26 at 175 to 220° C. The EVOH resin (A4) was kneaded in an extruder provided with a uniaxial screw having a diameter of 40 mm and L/D=22 at 190 to 240° C. Then, the PP resin (C3), the adhesive resin (B2) and the EVOH resin composition (A4) were introduced to a T-die (feedblock type die; a width of 600 mm) set at 240° C. and co-extruded.

The thus-obtained sheet was thermoformed (compressed air pressure: 5 kg/cm$^2$; plug: 45$\phi$×65 mm; syntax form; plug temperature:150° C.; and mold temperature: 70° C. were used) into a cup-shaped container (mold shape 70$\phi$×70 mm; draw ratio S=1.0) using a thermoforming machine (manufactured by Asano Seisakusho). The temperature of the sheet at the thermoformation was 150° C., 160° C. or 165° C. Thus, three kinds of containers, each of which was formed at a different thermoformation temperature (i.e., 150° C., 160° C. or 165° C.), were made. The appearance of the obtained container was visually evaluated. The thickness of the thinnest portion was obtained by measuring the thinnest portion in the vicinity of the intersection portions of the bottom face and the side faces of the molded product. The measurement of the oxygen permeability of the thermoformed containers and the drop test were performed according to the above-described methods. Table 3 shows the results of the tests. Table 3 shows also the results of Examples 14 to 16 and Comparative Examples 13 to 16, which will be described below.

Example 14

The following two EVOH resins (a5.1) and (a5.2) in an amount of 50 parts by weight each were dry-blended, and then the blend was melt-extruded with a screw having a Madox type kneading section with a diameter of 40 mm, L/D=24, and a compression ratio of 3.8 to form pellets of the EVOH resin mixture (EVOH resin (A5)).

EVOH resin (a5.1) had an ethylene content of 32 mol %, a saponification degree of 99.5% and a MFR of 3.5 g/10 min (210° C., 2160 g); and contained a phosphorus compound (potassium dihydrogen phosphate) in an amount of 20 ppm on the basis of the phosphorus element, and a sodium salt (sodium acetate) in an amount of 15 ppm on the basis of the sodium element.

EVOH resin (a5.2) had an ethylene content of 38 mol %, a saponification degree of 99.6% and a MFR of 3.8 g/10 min (210° C., 2160 g); and contained a phosphorus compound (potassium dihydrogen phosphate) in an amount of 100 ppm on the basis of the phosphorus element and a sodium salt (sodium acetate) in an amount of 50 ppm on the basis of the sodium element.

Using this EVOH resin (A5) and the same PP resin (C3) and adhesive resin (B2) as those used in Example 13, a container was produced by thermoforming in the same manner as in Example 13 and evaluated.

Example 15

The following two EVOH resins (a6.1) and (a6.2) in an amount of 50 parts by weight each were dry-blended, and then the blend was melt-extruded with a screw having a Madox type kneading section with a diameter of 40 mm, L/D=24, and a compression ratio of 3.8 to form pellets of the EVOH resin mixture (EVOH resin (A6)).

EVOH resin (a6.1) had an ethylene content of 32 mol %, a saponification degree of 99.5% and a MFR of 3.5 g/10 min (210° C., 2160 g); and contained a phosphorus compound (potassium dihydrogen phosphate) in an amount of 20 ppm on the basis of the phosphorus element.

EVOH resin (a6.2) had an ethylene content of 44 mol %, a saponification degree of 99.5% and a MFR of 13 g/10 min (210° C., 2160 g); and contained a phosphorus compound (potassium dihydrogen phosphate) in an amount of 65 ppm on the basis of the phosphorus element and a sodium salt (sodium acetate) in an amount of 20 ppm on the basis of the sodium element.

Using this EVOH resin (A6), the same PP resin (C3) and adhesive resin (B2) as those used in Example 13, a container was produced by thermoforming in the same manner as in Example 13 and evaluated.

Example 16

Using the same EVOH resin (A7) as the EVOH resin (a6.1) used in Example 15 and the same PP resin (C3) and adhesive resin (B2) as those used in Example 13, a container was produced by thermoforming in the same manner as in Example 13 and evaluated.

Comparative Examples 13 to 16

Comparative Examples 13 to 16 are the same as Examples 13 to 16, respectively, except that polypropylene (C4) having a stereoregularity index [M5] of 0.93 was used as the polypropylene.

TABLE 3

| | | Thermoformation temperature (° C.) | | | Oxygen permeability*a | 50% breakage height (m)*b |
|---|---|---|---|---|---|---|
| | | 150 | 160 | 165 | | |
| Example 13 | Container appearance*c | ABB | AAA | AAA | 0.9 | 4.25 |
| | Thickness of the thinnest portion (μm) | 635 | 640 | 640 | | |
| Example 14 | Container appearance*c | ABA | AAA | ABA | 2.6 | 4.5 |
| | Thickness of the thinnest portion (μm) | 640 | 645 | 630 | | |
| Example 15 | Container appearance*c | AAA | AAA | AAA | 3.1 | 4.75 |
| | Thickness of the thinnest portion (μm) | 650 | 650 | 645 | | |
| Example 16 | Container appearance*c | BBB | BCB | ABB | 1.1 | 4.5 |
| | Thickness of the thinnest portion (μm) | 635 | 605 | 650 | | |
| Comparative example 13 | Container appearance*c | CDC | CCC | BCC | 1.5 | 2.75 |
| | Thickness of the thinnest portion (μm) | 520 | 570 | 605 | | |
| Comparative example 14 | Container appearance*c | BBB | DDD | CCC | 3.1 | 3.5 |
| | Thickness of the thinnest portion (μm) | 620 | 530 | 600 | | |
| Comparative example 15 | Container appearance*c | AAA | DDD | BBB | 3.8 | 3.75 |
| | Thickness of the thinnest portion (μm) | 640 | 580 | 620 | | |
| Comparative example 16 | Container appearance*c | DDD | DDD | CCC | 2.5 | 3.25 |
| | Thickness of the thinnest portion (μm) | 520 | 535 | 595 | | |

*aMeasurement conditions: 20° C., 85% RH; unit: cc · 20μ/m² · day · atm
*bSamples (cups) thermoformed at 160° C. are used.
*cThe container appearance is evaluated in four grades of A to D (good: A > B > C > D: poor) regarding the formability, cracks, and wave patterns from the left.

What is claimed is:

1. A transparent multilayered structure comprising an A layer comprising ethylene-vinyl alcohol copolymer resin(s) (A) and a C layer comprising a polypropylene resin (C) which are laminated via a B layer comprising an adhesive resin (B), wherein the ethylene content of said ethylene-vinyl alcohol copolymer resin(s) (A) is 20 to 60 mol %, and the saponification degree of said ethylene-vinyl alcohol copolymer resin(s) (A) is at least 90%, the melt flow rate (MFR) of said polypropylene resin (C) at 230° C. under a load of 2160 g is in a range from 0.1 to 100 g/10 min, and the stereoregularity index [M5] of said polypropylene resin (C) defined by Equation 1, with absorption intensities of Pmmmm and Pw in the $^{13}$C-NMR spectrum of a boiling heptane insoluble component of said polypropylene resin (C), is at least 0.950, $$[M5]=[Pmmmm]/[Pw] \quad (1)$$

wherein [Pmnmm] is the absorption intensity derived from methyl groups of third propylene units in said polypropylene resin (C), each of the third propylene units being the third unit of five consecutive propylene units that are isotactically bonded, and [Pw] is the absorption intensity derived from all methyl groups of the propylene units.

2. The multilayered structure according to claim 1, wherein said ethylene-vinyl alcohol copolymer resin(s) (A) comprises at least two ethylene-vinyl alcohol copolymer resins having different melting points.

3. The multilayered structure according to claim 1 or 2, wherein said ethylene content of said ethylene-vinyl alcohol copolymer resin(s) (A) is 30 to 50 mol %.

4. The multilayered structure according to claim 1 or 2, wherein said adhesive resin (B) is a polyolefin modified with carboxylic acid.

5. The multilayered structure according to claim 1 or 2, which is a film stretched to 3 to 12 times larger in at least one direction.

6. The multilayered structure according to claim 5, which is a laminated film obtained by forming a laminate comprising the A layer, the B layer and the C layer by simultaneous co-extrusion molding and biaxially stretching this laminate, in which the laminate is stretched to 4 to 10 times larger in the longitudinal direction and 5 to 12 times larger in the transverse direction.

7. The multilayered structure according to claim 5, which is a laminated film obtained by stretching a film made of said polypropylene resin (C) to 4 to 10 times larger in the longitudinal direction, laminating the B layer and A layer in this order on the surface of the film made of said polypropylene resin (C) by extrusion-coating to form a laminate, and stretching the laminate to 5 to 12 times larger in the transverse direction.

8. The multilayered structure according to claim 5, which is a laminated film obtained by stretching a film made of said polypropylene resin (C) having the B layer on a surface thereof to 4 to 10 times larger in the longitudinal direction, laminating the A layer made of said ethylene-vinyl alcohol copolymer resin(s) (A) or a laminate comprising the A layer on the B layer of the obtained stretched film by extrusion-coating to form a laminate, and stretching the laminate to 5 to 12 times larger in the transverse direction.

9. A thermoformed container obtained by thermoforming the multilayered structure according to claim 1.

10. The thermoformed container according to claim 9, which satisfies Equations (2.1) to (2.3):

$$S \leq T/t \leq 20S \quad (2.1)$$

$$300 \leq T \leq 3000 \quad (2.2)$$

$$t \geq 100 \quad (2.3)$$

where T is the total thickness (μm) of all layers in the thickest portion of the container, t is the total thickness (μm) of all layers in the thinnest portion of the container, and S is the draw ratio of the container, and S is expressed by Equation (2.4):

$$S = \text{(depth of the container)/(diameter of a circle having the largest diameter that can be inscribed in an opening of the container)} \quad (2.4).$$

11. The multilayered structure according to claim 1, wherein said stereoregularity index [M5] of said polypropylene resin (C) is 0.950 to 0.995.

12. The multilayered structure according to claim 1, wherein said melt flow rate (MFR) of said polypropylene resin (C) is 1 to 50 g/10 min.

13. The multilayered structure according to claim 1, wherein said polypropylene resin (C) has additive(s) selected from the group consisting of nucleating agents, antioxidants, antistatic agents, lubricants, anti-blocking agents, ultraviolet absorbers and petroleum resins.

14. The multilayered structure according to claim 1, wherein said saponification degree of said ethylene-vinyl alcohol copolymer resin(s) (A) is about 95 mol % or more.

15. The thermoformed container according to claim 9, where said ethylene content of said ethylene-vinyl alcohol copolymer resin(s) (A) is about 30 to 45 mol %.

16. The multilayered structure according to claim 2, wherein said at least two ethylene-vinyl alcohol copolymer resins having different melting points is a mixture of two ethylene-vinyl alcohol copolymers (a1, a2) and satisfies Equations (2.1) to (2.3).

$$150 \leq MP(a1) \leq 172 \quad (2.1)$$

$$162 \leq MP(a2) \leq 200 \quad (2.2)$$

$$4 \leq \{MP(a2) - MP(a1)\} \leq 30 \quad (2.3)$$

where MP(a1) represents the melting point (° C.) of the ethylene-vinyl alcohol copolymer (a1) measured by a differential scanning calorimeter (DSC), and MP(a2) represents the melting point (° C.) of the ethylene-vinyl alcohol copolymer (a2) measured by a differential scanning calorimeter (DSC).

17. The multilayered structure according to claim 1, wherein said ethylene-vinyl alcohol copolymer resin(s) (A) has additive(s) selected from the group consisting of boron compounds, alkali metal salts and phosphorus compounds.

18. The multilayered structure according to claim 1, wherein the thickness of said A layer is about 1 to 20 μm, the thickness of said B layer is about 0.5 to 50 μm and the thickness of said C layer is about 5–95 μm.

19. The thermoformed container according to claim 9, which satisfies Equations (2.1.1), (2.2.1) and (2.3.1):

$$1.5S \leq T/t \leq 15S \quad (2.1.1)$$

$$500 \leq T \leq 2000 \quad (2.2.1)$$

$$t \geq 200 \quad (2.3.1)$$

where T is the total thickness (μm) of all the layers in the thickest portion of the container, t is the total thickness (μm) of all the layers in the thinnest portion of the container, and S is the draw ration of the container where S is expressed by Equation (2.4):

$$S = \text{(the depth of the container)/(the diameter of the circle having the largest diameter}$$

that can be inscribed in the opening of the container)+tm 2.4).

* * * * *